United States Patent [19]
Falgayrettes et al.

[11] 3,871,459
[45] Mar. 18, 1975

[54] METHOD AND A DEVICE FOR COMBATING SODIUM FIRES

[76] Inventors: Michel Falgayrettes, 6 Les Sarments, 04 100 Manosque; Robert Pontier, Bellver, Traverse Malakoff; Michel Sauvage, Parc Laurana, Traverse Malakoff, both of 13 100 Aix-en-Provence, all of France

[22] Filed: May 9, 1973

[21] Appl. No.: 358,820

[30] Foreign Application Priority Data
May 18, 1972 France .............................. 72.17908

[52] U.S. Cl. ................................ 169/49, 169/54
[51] Int. Cl. ................................................ A62c 3/00
[58] Field of Search ........................... 169/2 R, 1 A

[56] References Cited
UNITED STATES PATENTS
3,339,624  9/1967  Cowgill .............................. 169/2 R
3,448,808  6/1969  Scofield et al. .................... 169/2 R

*Primary Examiner*—Lloyd L. King
*Attorney, Agent, or Firm*—Flynn & Frishauf

[57] ABSTRACT

A sodium fire is confined within a container which produces a quenching action by reducing the oxygen supply to the mass of burning metal. The container collects the sodium which flows from a leakage source and is almost completely closed by a top plate which serves both as quencher and collector for directing the sodium into the container. A mass of metal in a divided state and having a high heat-absorption capacity is arranged within the container so as to permit heat transfer and cooling of the sodium which is distributed throughout the container.

13 Claims, 1 Drawing Figure

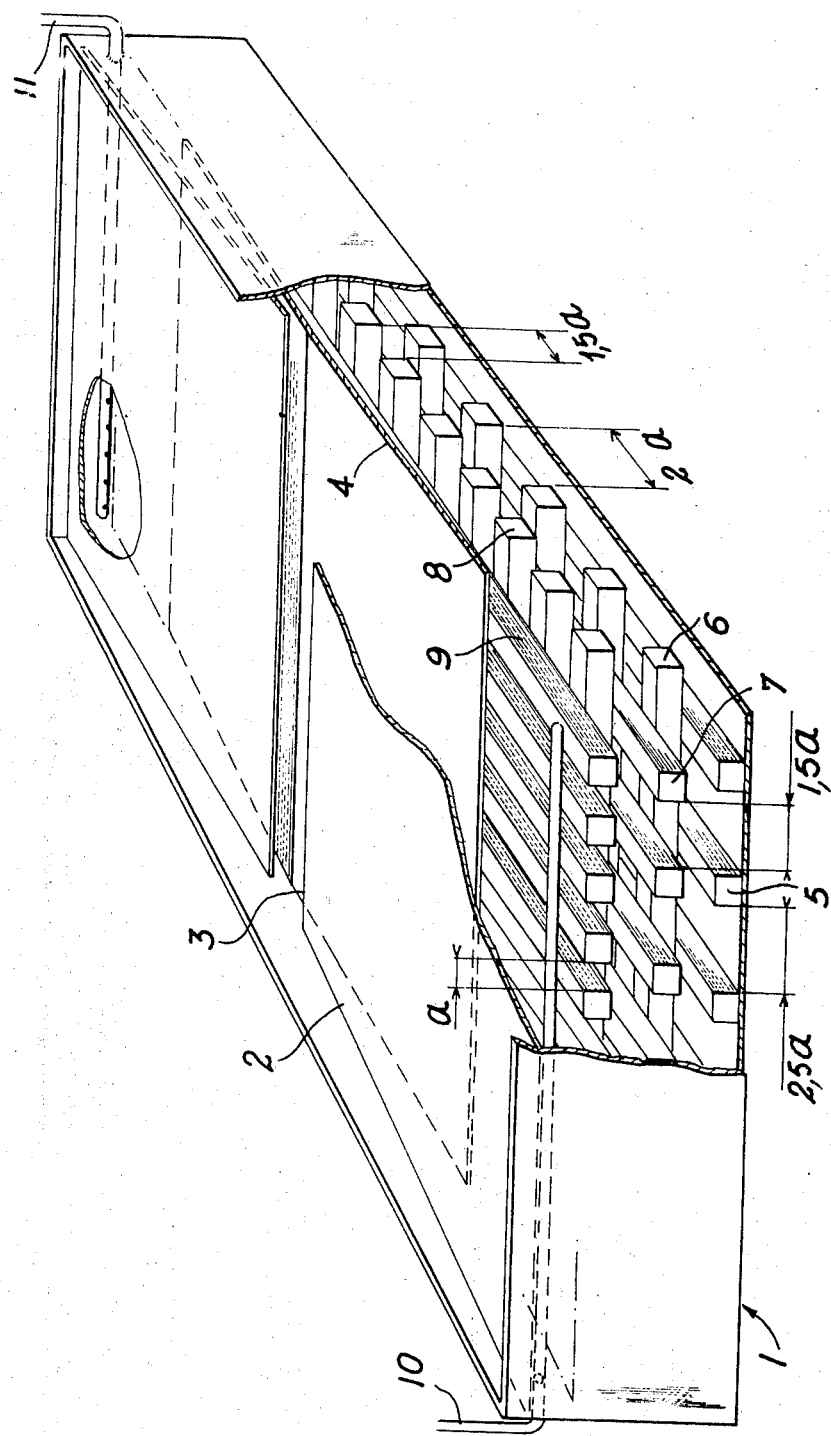

METHOD AND A DEVICE FOR COMBATING SODIUM FIRES

The use of liquid sodium which has been developed by the nuclear reactor industry as a heat-transfer medium gives rise to major problems of reactor safety when taking into account the high reducing power of this metal and its spontaneous flammability in air above approximately 450°C.

The various extinguishing devices or means employed up to the present time for combating large-scale sodium fires, namely fires involving quantities of sodium greater than 10 kg and heated to a temperature above 500°C, have all proved to be either partly or wholly inoperative.

The idea of depriving a sodium fire of oxidizer (oxygen of the air) is technologically difficult to carry into practice and does not usually lead to decisive results.

This invention is directed to a method of combating sodium fires which is easy to carry out and more effective than the systems employed in the prior art.

Said method is essentially characterized in that the sodium fire is subjected simultaneously to confinement within an enclosure which reduces the oxygen supply and to powerful cooling by contacting the sodium within said enclosure with a heat sink which absorbs a large quantity of heat.

This invention also relates to a containment device towards which the burning sodium is directed and which is both effective and simple in design. Said device combines both the functions of quencher in which the supply of oxygen to the mass of burning metal is limited to a minimum and which has a high heat-absorption capacity in order to reduce the temperature of the burning sodium as rapidly as possible to a value below the Auto-Ignition Temperature (AIT) which is roughly 450°C. The device aforesaid essentially comprises in combination:

a sheet-metal container which is capable of collecting the sodium as this latter flows from a leakage source under the action of gravity;

a sheet-metal plate which closes the container almost completely at the top portion thereof and performs the functions of quencher and of collector for directing the sodium from the leakage source to the interior of the container;

a mass of material having a high heat-absorption capacity and arranged in a divided state within the container so as to provide a large surface area for heat exchange with the sodium which is distributed throughout the container at the moment of leakage.

In accordance with another characteristic feature of the device which is provided by the invention, the sheet-metal plate which closes the container almost completely at the top portion thereof is either slightly inclined in the form of a collector so as to permit both the flow and the admission of sodium into the container or pierced by a predetermined number of holes.

In accordance with another important feature of the device which is provided by the invention, the material which affords a high heat-absorption capacity and is intended to cool the sodium can be constituted simply by a mass of scrap-iron in a divided state which affords a large surface area for heat exchange with the liquid sodium. One particularly advantageous form of construction consists in providing the heat-absorption capacity aforesaid by means of a heat sink consisting of a system of steel rods distributed in a number of crossed horizontal layers. Different materials can also be employed in order to constitute a mass having a high heat-absorption capacity such as, for example, cast-iron, foundry-scrap and lead.

Finally, in order to complete the action of the quencher-plate and of reduction of temperature on the combustion of the sodium, provision can also be made either for a supply of powder to the plate which closes the container or for a flow of neutral gas (argon or nitrogen) into the container, thus preventing the admission of air which is necessary for combustion.

The method and the device in accordance with the invention comply with safety requirements in a wholly satisfactory manner and make it possible by particularly simple means to receive burning liquid sodium by confining this latter within an enclosure in which the sodium is simultaneously deprived of oxidizer and subjected to powerful cooling, with the result that the destructive action of the burning sodium on the environment is prevented and that the fire is rapidly extinguished. The device in accordance with the invention can readily be placed in position beneath all circuits or equipment units which contain liquid sodium at high temperature, which are subject to leakage and consequently present a fire hazard.

In any case, a better understanding of the invention will be obtained from the following description of one exemplified embodiment, reference being made to the single accompanying FIGURE which represents a cut-away view in perspective showing the device of the invention.

There is shown in the accompanying FIGURE the sheet-metal container 1 which is almost completely closed by an inclined sheet-metal plate 2 in the form of a collector in order that the sodium should penetrate into the container 1 through the longitudinal gap 3. The distribution of sodium within the container 1 is ensured by a shaped sheet-metal plate 4.

In the example of construction described in the figure, the hot sodium flows into the container 1 through a system consisting of five horizontal layers of steel bars designated respectively by the reference numerals 5, 6, 7, 8 and 9 from the bottom of the container 1 upwards, the pitch of the bars constituting each layer being such as to increase towards the bottom of said container 1. The effect of this particular arrangement is in fact to permit the sodium to occupy the entire volume of the container 1 before it has cooled to an excessive degree and further to permit the top layer 9 which forms the most closely spaced assembly to perform the additional function of quencher. In the example herein described, the steel bars all have the same square cross-section having a length $a$ along each side but any other shape would also be suitable; the pitch of the bars constituting each layer varies in the following manner:

the interval between the bars of the bottom layer 5 is $2.5\,a$;

the interval between the bars of the layer 6 is equal to $2\,a$;

the interval between the bars of the layer 7 is equal to $1.5\,a$;

the interval between the bars of the layer 8 is equal to $1.5\,a$;

the interval between the bars of the layer 9 is equal to $a$.

Two pipes 10 and 11 pierced by holes are disposed laterally between the walls of the container 1 so as to permit rapid distribution of inert gas at the time of sodium leakage. When a leak of this type occurs, a powder can be deposited in the gap 3 in order to prevent admission of air in the event that the inert gas is inoperative or in order to complete the action of this latter.

As is readily apparent, the embodiment hereinabove described is not intended to be limitative. In particular, the mass of metal which consists of steel bars in this example could be replaced by another substance which does not react violently with sodium at high temperature and which could also exhibit high latent heat of melting such as lead, for example.

What we claim is:

1. A method of combating sodium fires, wherein the burning sodium is subjected simultaneously to confinement within an enclosure which reduces the oxygen supply and to powerful cooling by contacting the sodium within said enclosure with a heat sink which absorbs a large quantity of heat.

2. A device for placing beneath an apparatus using liquid sodium in order to prevent fires resulting from sodium leakage, said device comprising in combination:
    a sheet metal container;
    sheet-metal collecting plate means for collecting sodium as it flows from a leakage source under the action of gravity and for covering said container, said plate means closing the container almost completely at the top portion thereof and performing the functions of collector for directing the sodium from the leakage source to the interior of the container and of distributing sodium in the upper part of the interior of said container, in addition to contributing to quenching;
    a mass of material having a high heat-absorption capacity and arranged in a divided state within the container so as to provide a large surface area for heat exchange with the sodium and to provide paths for distributing the sodium throughout said container.

3. A device according to claim 2, wherein said collecting plate means includes at least one plate slightly inclined towards a collecting slot.

4. A device according to claim 2, wherein said collecting plate means is provided with a predetermined number of holes.

5. A device according to claim 2, wherein said collecting plate means includes upper plate means defining at least one collecting inlet and lower plate means below each such inlet arranged to ensure the distribution of the sodium within said container.

6. A device according to claim 2, wherein the material which has a high heat-absorption capacity is constituted by a mass of scrap-iron in the divided state.

7. A device according to claim 2, wherein the material which has a high heat-absorption capacity is constituted by a system of metallic bars arranged in a number of crossed horizontal layers.

8. A device according to claim 7, wherein the metallic bars are relatively spaced in each layer with a pitch which increases from the top to the bottom of the container.

9. A device according to claim 2, wherein the material which has a high heat-absorption capacity is selected from the group comprising foundry-scrap, cast-iron and lead.

10. A device according to claim 2, wherein said device also comprises at least one pipe traversing said device and pierced by holes so as to permit rapid distribution of inert gas within the container at the time of a flow of sodium.

11. A device according to claim 5, including means for depositing a powder of refractory material over said collecting inlet of said collecting plate means after the occurrence of a flow of sodium in order to reduce the admission of air into the container.

12. A method according to claim 1 for combating sodium fires, substantially as hereinbefore described.

13. A device according to claim 2, substantially as hereinbefore described with reference to and as illustrated in the accompanying drawings.

* * * * *

UNITED STATES PATENT OFFICE
CERTIFICATE OF CORRECTION

Patent No. 3871459      Dated March 18, 1975

Inventor(s) Michel FALGAYRETTES et al.

It is certified that error appears in the above-identified patent and that said Letters Patent are hereby corrected as shown below:

On the first page of the patent, the name of the Assignee should appear in the proper place as follows:

-- COMMISSARIAT A L'ENERGIE ATOMIQUE --.

Signed and Sealed this eleventh Day of November 1975

[SEAL]

Attest:

RUTH C. MASON
Attesting Officer

C. MARSHALL DANN
Commissioner of Patents and Trademarks